United States Patent [19]

Stoll et al.

[11] Patent Number: 5,443,093

[45] Date of Patent: Aug. 22, 1995

[54] CONTROL DEVICE FOR A MULTIWAY VALVE

[75] Inventors: Kurt Stoll, Esslingen; Jürgen Schnatterer, Filderstadt, both of Germany

[73] Assignee: Festo KG, Esslingen, Germany

[21] Appl. No.: 215,511

[22] Filed: Mar. 22, 1994

[30] Foreign Application Priority Data

Mar. 25, 1993 [DE] Germany .................. 43 09 695.6

[51] Int. Cl.6 .................. F15B 13/044; F16K 11/24
[52] U.S. Cl. .................. 137/596.17; 137/625.64; 251/129.03
[58] Field of Search .................. 137/596.17, 625.64; 251/129.03

[56] References Cited

U.S. PATENT DOCUMENTS

| | | | |
|---|---|---|---|
| 2,821,997 | 2/1958 | Clay et al. | 137/596.17 |
| 3,269,417 | 8/1966 | Lansky et al. | 137/625.64 |
| 3,842,860 | 10/1974 | Stampfli | 137/596.17 |
| 4,207,917 | 6/1980 | Opel et al. | 251/129.03 X |
| 4,785,848 | 11/1988 | Leiber | 137/596.27 |
| 5,009,250 | 4/1991 | Kline et al. | 137/596.17 |

FOREIGN PATENT DOCUMENTS

| | | | |
|---|---|---|---|
| 0260065 | 3/1988 | European Pat. Off. | |
| 63-53378 | 3/1988 | Japan | 137/625.64 |
| 3-20185 | 1/1991 | Japan | 137/625.64 |
| 4-25081 | 2/1992 | Japan | |
| 4-60287 | 2/1992 | Japan | 137/625.64 |

*Primary Examiner*—Gerald A. Michalsky
*Attorney, Agent, or Firm*—Hoffmann & Baron

[57] ABSTRACT

The invention proposes a control device for multiway valves. It comprises two adjacently arranged solenoid means, which are respectively associated with a valve member to be driven. Each solenoid means comprises a coil. Outside the coils there is a yoke device for conduction of the magnetic fields, which are comprised in a yore part, which is associated with coils so that it may be pervaded by the magnetic fields of both coils. It is in this manner that an extremely compact design is rendered possible.

10 Claims, 2 Drawing Sheets

CONTROL DEVICE FOR A MULTIWAY VALVE

BACKGROUND OF THE INVENTION

The invention relates to a control device for a multiway valve comprising two adjacently arranged solenoid means, with each of which a valve member to be driven is associated, each solenoid means having a coil and furthermore a yoke means arranged outside the coils for the conduction of magnetic fields.

A control device of this type is described for example in the Japanese utility model 4-25081. It is fitted at one end on a multiway valve. The two solenoids belong to two solenoid valves, which constitute the control valves of the multiway valve. By exciting the one or the other solenoid the associated valve member can be actuated so that the valve spool of the multiway valve can be switched over from one setting to the other.

Since both solenoids are arranged adjacent to one another at one end of the multiway valve there is generally a relatively short overall length. In order to ensure that furthermore the control device has a compact overall size despite the twin magnet arrangement, a yoke device is also provided, which consists of two yoke sleeves surrounding the respective coil coaxially so that despite having small coils powerful magnetic fields and correspondingly high actuating forces can be obtained.

SHORT SUMMARY OF THE INVENTION

One object of the invention is to provide a control device of the type initially mentioned which renders possible a more compact arrangement.

In order to achieve these or other objects appearing herein, in the invention the yoke device comprises a yoke part which is arranged to be common to the two coils so that it may be pervaded by the magnetic fields of both coils.

Whereas in the prior art design each solenoid was provided with its own yoke, which is at all times only pervaded by the magnetic field of the one associated coil, in the present invention a yoke part is provided, which is shared by the two coils simultaneously and dependent on the state of excitation is pervaded by the magnetic field of the one and/or of the other coil. In the case of alternating excitation of the solenoids the yoke part is accordingly subjected in an alternating manner to the magnetic field of both coils. It is in this manner that it is possible for the coils to be arranged even closer together with the result that the overall volume of the control device is reduced.

Further advantageous forms of the invention are recited in the claims.

The two coils are preferably arranged with their longitudinal axes parallel to each other, the yoke part, which is common to the two coils preferably being located in the part between the two coils.

Each respective coil is preferably flanked on at least one and preferably both ends by a yoke portion, which is connected with the common yoke part. The arrangement is preferably so designed that the yoke device has a H-like configuration.

The yoke device and the coils are preferably accommodated in a housing, in which they are cast or potted.

In the case of a further preferred design the two coils are arranged one over the other in the vertical direction of the control device, the longitudinal axes thereof being arranged with an offset at a right angle to a reference plane, which is defined by the vertical direction and the longitudinal direction of the control device. This design is more especially to be recommended when the control device is additionally furnished with a hand operating device, which possesses two small actuating plungers, which are respectively associated with one of the valve members and are manually set, for these valve member, the longitudinal axes of the actuating plunger not intersecting the longitudinal axis of the respectively associated valve member, and the valve members being so arranged in relation to one another that their longitudinal are arranged at a right angle to the said reference plane with a offset to each other. One of the two actuating plungers is normally longer and may in the case of such a design be made to extend past the valve member associated with the other actuating plunger without special sealing operations being necessary, since the space receiving the said valve member is not intersected by the hole for the actuating plunger. Such an arrangement is also an advantage in the case of a known twin solenoid arrangement, as is for example disclosed in the initially mentioned Japanese patent publication 4-25081 U.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENTS OF THE INVENTION.

Figure 1:
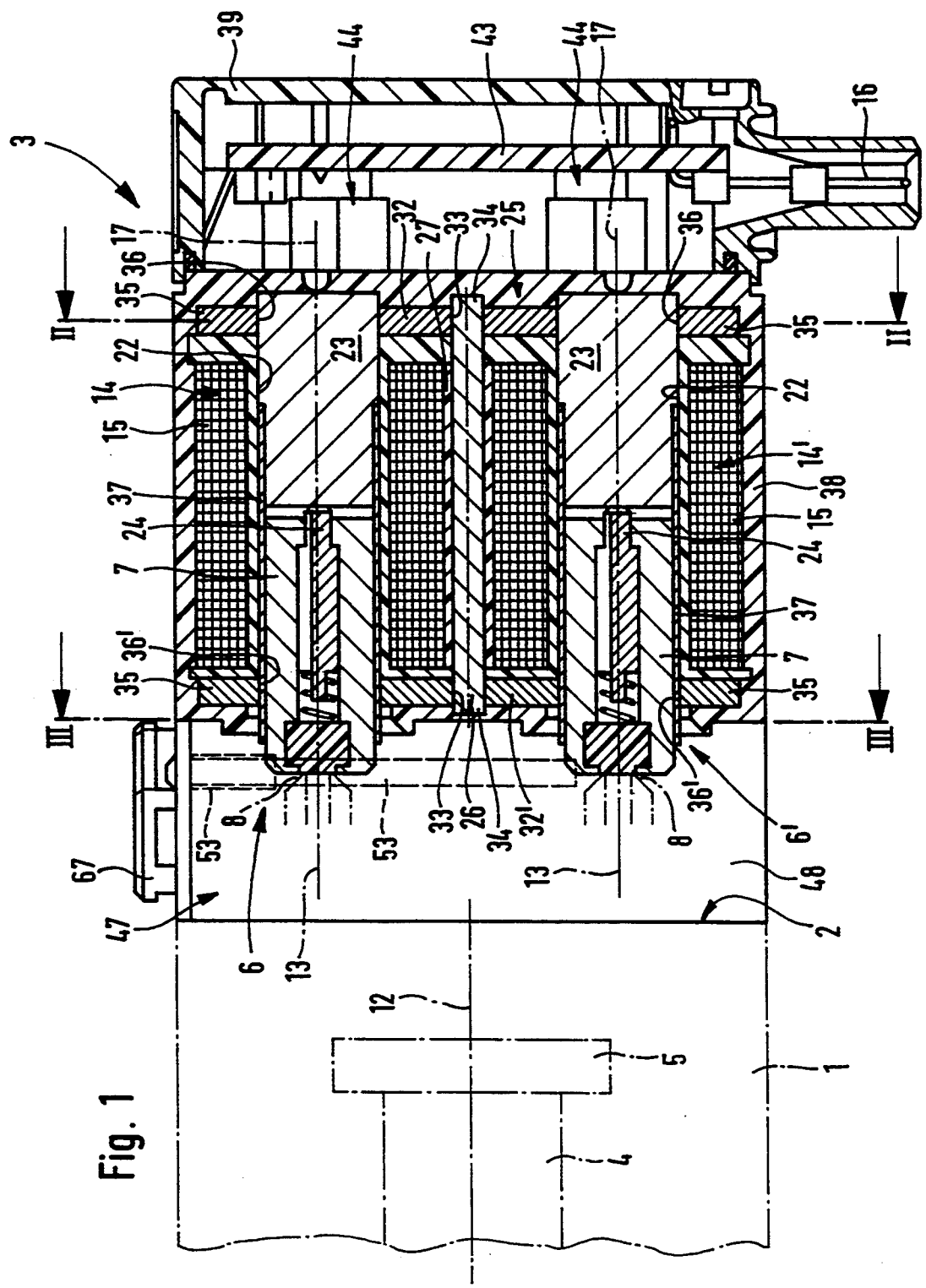
FIG. 1 shows a preferred design of the control device in accordance with the invention as seen in longitudinal section and in a condition flange-mounted on a multiway valve, the multiway valve only being indicated by a terminal portion thereof in chained lines.

As shown in chained lines in FIG. 1 on the terminal surface 2 of a multiway valve 1, a control device 3 is detachably mounted. The control device 3 axially adjoins the multiway valve 1. In the case of the multiway valve 1 it is a question of, for example, a 5/3 way valve. It comprises a valve spool which may assume various different switching settings, in which it produces or interrupts fluid power connections with a supply of power fluid, one or more loads and one or more venting openings. The switching over between settings is performed pneumatically when one or more of the actuating surfaces associated with the valve spool are acted upon by driving air, such surfaces being for instance provided on one or more actuating pistons 5 cooperating with the valve spool 4 and of which one is depicted in FIG. 1. The supply of the respective actuating power fluid is via the control device 3 described in the following in detail. The multiway valve 1 is preferably mounted on a distributing plate or manifold plate, which has internal ducts for the power fluid and which communicate with valve ducts (not illustrated) of the multiway valve 1.

The control device 3, depicted by way of example, comprises two electrically operated solenoid valves 6 and 6' functioning as control valves. Each of them possesses a more particularly rod-like valve member 7, which cooperates with a valve seat 8, which is only indicated in chained lines in FIG. 1. If as illustrated the two valve seats 8 are closed, the valve spool 4 will as a rule be in a neutral setting. By selective operation of the solenoid valves 6 and 6' the one or the other value seat 8 is cleared and the valve spool is switched over in the one or the other axial direction by the actuation on the respective actuating surface.

The two solenoid valves 6 and 6' are arranged in the transverse direction at a right angle to the longitudinal axis 12 of the multiway valve 1 and the control device 3 so as to be adjacent to each other. The longitudinal axes 13, which coincide with the direction of actuating, of the valve members 7 extend in this respect in parallelism to the said longitudinal axis 12.

For the operation thereof each solenoid valve 6 and 6' has a solenoid 14 and 14'. Such solenoid comprises a coil 15, which is connected via electrical wiring, not illustrated, with an electrical connection device 16, with which the control wires supplying the necessary actuating signals may be detachably connected. The coils 15 are arranged with their longitudinal axes 17 in parallelism to each other and to the longitudinal axis 12. The coils 15 are axially at the same level so that their outer cylindrical surfaces 18 are turned towards each other.

Each coil 15 possesses a central through opening 22 extending axially into which for a short distance there extends the respectively associated valve member 7 starting from the end face turned towards the multiway valve 11. The internally arranged terminal portion of the valve member 7 is axially opposite to a magnet core 23, which extends into the through opening 22 starting from the terminal surface opposite to the multiway valve 1.

Owing to there being a resilent return element 24, which cooperates with the associated magnet core 23, the valve members 7 are normally held axially spaced from the associated magnet core 23 and simultaneously urged into the closed setting illustrated. As soon as current flows through the one coil a magnetic field is however built up, whose magnetic force attracts the respective valve member 7 towards the associated magnet core 23 with a reduction of the air gap and consequently switches the same over into the open position.

In order to achieve a high actuating force while still maintaining a compact design, there is, in addition to the magnet cores 23, a yoke device 25 arranged externally of the coils 15. It more particularly consists of iron and reduces the magnetic resistance For the magnetic field outside the coils 15. Its particular advantage is that it comprises a yoke part 26, which is associated with both coils the so that it is pervaded by the magnetic field of both coils. The respective yoke part 26 is arranged preferably in the intermediate portion 27 between the two adjacent coils 15, it preferably extending along the entire length of the both coils 15.

If the solenoid 14 shown at the top in FIG. 1 is excited, the field lines produced outside the coil will extend at least along the yoke part 26. The same applies for the field lines of the second solenoid 14', when the same is excited. The yoke part 26 is hence multiply used. It is in this manner that it is possible for the two coils 15 to be arranged very close together, something which reduces the transverse dimensions—in the present case in the vertical direction—without impairing the actuating force.

In the specific case of the present embodiment of the invention the yoke part 26 is plate-like in form, it being so aligned that its two mutually opposite plate surfaces 28 are respectively facing one of the coils 15.

In the illustrated working embodiment of the invention there are no further yoke portions, besides the above mentioned yoke part 26, adjacent to the outer cylindrical surfaces 18 of the coils 15. More particularly the outer surface parts, which are diametrally opposite to each other, of the coils 15 are preferably free of yoke means, something which permits a further reduction in the transverse dimensions of the control device 3.

The yoke device 25 of the embodiment of the invention has a H-like geometry. The central connecting limb of the letter H constitutes the yoke part 26 which is arranged to be common to the two coils 15. Its two axially directed end surfaces are adjoined by a respective transverse element 32 and 32' of the yoke, which constitute the two parallel limbs of the letter H and are connected in a conducting fashion with the yoke part 26. They are preferably also made in plate-like form, the plate surfaces thereof being aligned parallel to the terminal surfaces of the coils 15. In the case of the two transverse limbs 32 and 32' of the yoke it is preferably a question of integral components, which are manufactured separately from the yoke part 26, but are connected firmly thereto. The connection is provided for example by having a generally central hole 33 in each transverse yoke limb 32 and 32', into which hole a terminal projection 34 on the yoke part 26 can be plugged and then swaged in position.

It is in this manner that each coil 15 is flanked at its axially directed surface by a yoke portion 35, which for example is constituted by one respective half of the associated transverse limbs 32 and 32' of the yoke.

The iron or magnet cores 23 are conductingly and more particularly firmly connected with the yoke portions 35 provided at the associated terminal surface. The magnet cores 23 preferably extend some distance on the terminal side, facing away from the associated valve member, out of the through opening 22 and into a complementary recess or through hole 36 in the associated yoke portion 35.

On actuation a magnetic circuit may consequently be formed for each solenoid 14 and 14', such magnetic circuit extending over the yoke portion 35 thereof, the yoke part 26 provided in common, the yoke portion 35 associated with the valve member 7 and the valve member 7 itself and then back to the magnet core 23.

The assembly of the arrangement is extremely simple. After firstly assembling the yoke device 25, the coils 15 are plugged into the two intermediate spaces between the transverse limbs 32 and 32' of the yoke on each side of the yoke part 26. Then the magnet cores 23 are slipped into position which preferably have a sleeve-like extension 37 towards the respective valve member 7 and which serves as a guide bushing for the coaxially inserted valve members 7. This extension 37 preferably projects at the terminal surface of the coils 15 and out of the through opening 22 and fits into a through opening 36', having a complementary diameter, in the associated yoke portion 35, through which it preferably extends. Once the magnet core 23 has been inserted into the sleeve-like extension 37 each respective coil 15 will be locked in the transverse direction additionally to being held axially by the transverse yoke limbs 32 and 32'. In order to ensure that there is no undesired change in the relative position between the individual components the entire arrangement is locked in a housing 38. In the case of this housing it is preferably a question of a cast part which is produced around the solenoid arrangement. The material of the housing may be immediately adjacent to the outer surfaces 18 of the coils 15 so that the latter, just like the yoke are completely potted in the housing material, which is more particularly a synthetic resin.

A further housing part 39 can be more particularly detachably mounted at the end side, facing away from tile solenoid valve 38 axially, such additional housing part 39 accommodating a printed circuit board 43. It is on the one hand electrically connected with the connection device 16 and on the other hand it is connected, more particularly by electrical plug means 44, with the wires of the coils. The housing part 39 may be pluggedly connected with the housing 38, the electrical plug means 44 coming automatically into a plugged engagement. Additional fixing by means of screws is possible. Via the electrical connection device 16 it is therefore possible to simultaneously connect the two coils electrically using a single multiple plug connector.

Figure 2:
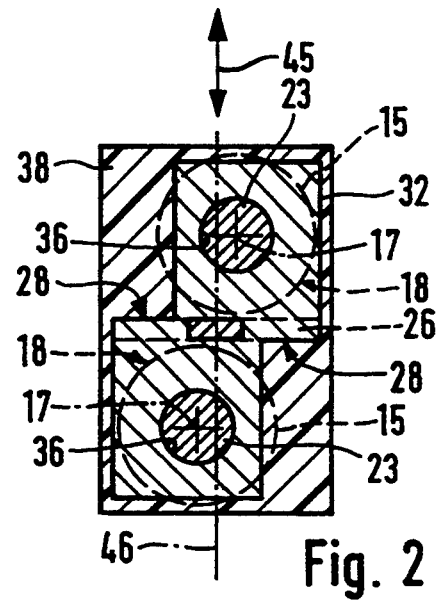
FIG. 2 illustrates a cross section taken through the control device of FIG. 1 on a smaller scale on the section line II—II therein.
Figure 4:
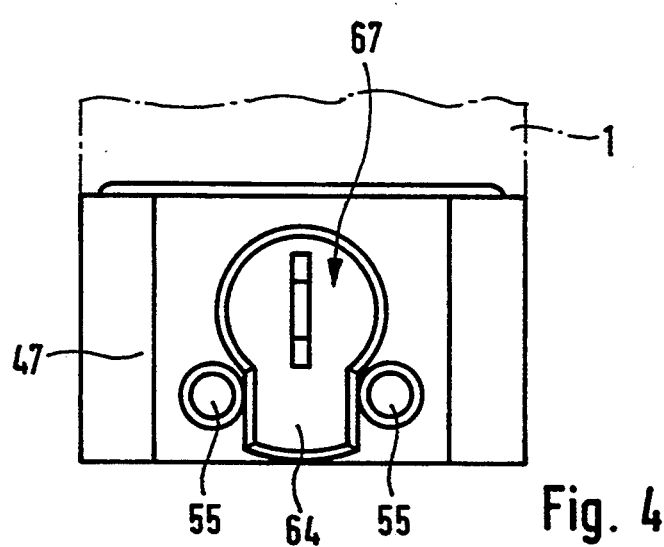
FIG. 4 is a plan view of the portion having the hand operating device looking in the direction indicated by the arrow IV in FIG. 3.

In the case of the embodiment of the invention illustrated by way of example a particularly slim form is desired, since several combinations of multiway valve control device are to be fitted together side by side to give range or battery. The coils 15 are consequently arranged one over the other in a vertical direction 45, which extends at a right angle to the direction of the row of the said combination. The control device 3 preferably has a rectangular cross section, the major side extending in the height direction 45 (FIG. 2).

Furthermore the working embodiment is so designed that the longitudinal axes 17 of the coils 15 are arranged in relation to one another in a rectangular direction in relation to a reference plane 46 with an offset, the said reference plane 46 being defined by the vertical direction 45 and the direction of the longitudinal 12 of the control device 3. The reference plane 46 is in the present working embodiment a longitudinal median plane, the longitudinal axes 17 being arranged on opposite sides of this plane, more particularly at an equal distance therefrom (FIG. 2).

Figure 3:
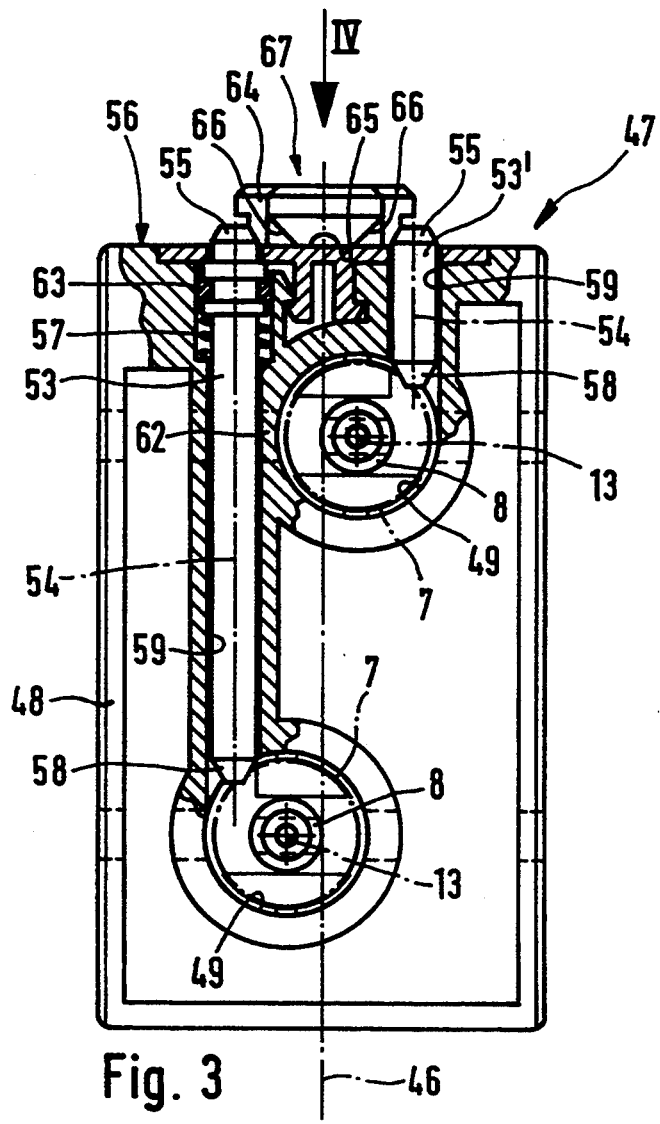
FIG. 3 shows a further cross section taken through the control device depicted in FIG. 1 adjacent to the hand operated device along the section line III—III, the valve means not being illustrated.

This arrangement has been selected for the present working embodiment in order to obtain a suitably offset arrangement of the value members 7, something which furthermore renders it possible to provide a particularly advantageous manual actuating device 47, which when necessary renders possible operation of the valve members 7 by hand. It is mounted in the portion between the housing 38 and the terminal surface 2 of the multiway valve 1 and preferably possesses its own housing 48. Its design may be seen more particularly from FIG. 3, in which the valve members 7 are only marked in as shown in chained lines in order to make the drawing more straightforward.

The valve seats 8 are preferably located on or in the housing 48 of the manual operating device 47. They are respectively arranged on the floor of a recess 49, which is open towards the coils 15 and into it the valve members 7 project at the end. Owing to the coaxial alignment of each respective coil 15, of the associated valve member 7 and of associated recess 49 the recesses 49 have a lateral offset, corresponding to the recesses 49, in relation to the reference plane 46, The manual operating device 47 possesses two actuating plungers 53 and 53', of which each is associated with one of the valve members 7. They extend parallel to each other and are respectively able to be set in the direction of their longitudinal axes 54 in relation to the housing 48. The longitudinal axes 54 extend in parallelism to the reference plane 46 on opposite sides thereof; they are so arranged that they do not intersect the longitudinal axis 13 of the respectively associated valve member 7 and in fact extend past the same with a clearance.

Both actuating plungers 53 and 53' are so arranged that an axial end part 55 on a common outer surface 56—which in the working embodiment is turned upwards—extends out of the housing 48. They are resiliently biased into this initial position, a spring 57 for this purpose only being indicated in the case of one actuating plunger 53 in order to make the drawing more straightforward. The opposite terminal portion, which in what follows is termed the actuating end 58, of the actuating plungers 53 and 53' extend peripherally into the recess 49 for the associated valve member 7. If now a finger is thrust against the outer terminal portion 55 of an actuating plunger 53, the same will be shifted further into the associated recess 49 and the actuating end 48 will be thrust against the terminal portion of the associated valve member 7 so that the latter is lifted away from the valve seat 8. If the finger is now removed the actuating plungers will be automatically reset in the initial setting owing to the resilient return force. The actuating plungers 53 and 53' preferably have a circular cross section and taper at the actuating end. The actuating end 58 is preferably designed to be frustoconical. Therefore no means are necessary to prevent relative rotation as regards the actuating plungers 53, for at all times there is an oblique surface, defined by the actuating end 53, is opposite to the valve member 7, such surface being able to slide against one associated valve member 7 to set the same, when the respective actuating plunger 53 and 53' is shifted in position.

The two actuating plungers 53 and 53' preferably run in channel-like recesses 59, which open at one end at the outer surface 56 and at the other end at the associated recess 49.

Owing to the different distance between the outer surface 56 and the respective recess 49 the two actuating plungers 53 and 53' are of different length. The longer actuating plunger 53 extends laterally past the recess 49 nearer to the outer surface 56. Owing the transverse offset of the two recesses 49 it is possible to ensure that the actuating plunger 53 may be extended past the respective recess 49 and does not partly extend through the same as well. Between the recess 49 through which the same extends and the longer actuating plunger 53 there remains a wall section 62 delimiting the recess 49. In other words the recess 49 adjacent to the outer surface 56 is not cut by the receiving recess 59 leading to the other recess 49, of the associated actuating plunger 53. It is in this manner that complex seals are made unnecessary, since the recess 49 may be acted upon by fluid power medium in accordance with the position of switching of the associated valve member 7.

The longitudinal axis 13 of the valve member 7, which is nearer to the output surface 56, is arranged on the one side of the median longitudinal reference plane 46. The longitudinal axis 13 extends here in the portion between the reference plane 46 and the longitudinal axis 54 of the associated actuating plunger 53'. The longitudinal axis 13 of the valve member 7, which is further removed, is arranged on the other side of the reference plane 46, but however is also in the portion between this reference plane 46 and the longitudinal axis 54 of the associated longer actuating plunger 53.

Between a respective actuating plunger 53 or 53' and the housing 48 a sealing ring 63 is preferably also provided, which to make the drawing more straightforward is only indicated in the case of the longer actuating plunger 53. It prevents escape of fluid power medium from the associated reason 49 via the adjoining receiving recess 59.

The manual operating device 47 of the working embodiment is furthermore fitted with a locking device 67. This renders possible a selective locking of one of the actuating plungers 53 and 53' in the pressed-in, actuated position in a detachable fashion. It comprises a pivotal part 64, which is bearinged for rotation in relation to the housing 48, and which may be pivoted over the one or the other terminal portion 55 of the actuating plunger 53. It is arranged adjacent to the outer surface 56 and possesses a thrust surface 65 on the side facing the housing 48. In the pivoted setting this thrust surface 65 may act on the selected actuating plunger 53 and thrust it inwards. Oblique surfaces 66, which adjoin the thrust surface 65, of the pivot part 64 ensure that a given actuating plunger 53, on pivoting of the pivot part 64, will be transferred from the initial setting into the actuated setting without additional manual action being called for. The locking action may be an advantage during setup in the course of production or during repairs.

We claim:

1. A control device for a multiway valve, comprising:
   two adjacently arranged solenoid means, to each of which a valve member to be actuated is associated;
   each solenoid means having a coil, wherein said coils are arranged with parallel axes and with portions of their outer cylindrical surfaces facing each other, an intermediate area being provided between said coils;
   yolk means positioned proximate said coils and arranged for conduction of magnetic fields generated by the coils, said yoke means comprising a yolk part which is positioned in said intermediate area and being associated with both coils for multiple use wherein field lines of the magnetic fields of both coils are able to extend along said yoke part;
   said yoke part being the only portion of the yoke means which is positioned in the area surrounding the cylindrical surfaces of the coils.

2. The control device as recited in claim 1, wherein said yoke part arranged to be common to the two coils is plate-like in form and include opposing surfaces, the opposing plate surfaces each being turned towards one of the two coils.

3. The control device as recited in claim 1, wherein each coil is flanked on at least one of the terminal surfaces by a yoke portion of said yoke means.

4. The control device as recited in claim 3, wherein the yoke means has the configuration of a letter H, whereof the central transverse limb constitutes the common yoke part and the other four limbs of the letter H constitute the yoke portions associated with the terminal surfaces.

5. The control device as recited in claim 4, wherein the respective two yoke portions, which are associated with the terminal side, directed towards the same axial end, of the two coils, are collected together in the form of a transverse yoke element, which is attached at the associated terminal end of the separately designed yoke part, which is arranged in common.

6. The control device as recited in claim 3, wherein the end yoke parts are designed in the form of plates.

7. The control device as recited in claim 1, wherein the yoke means and the coils are potted in a housing of synthetic resin.

8. The control device as recited in claim 1, wherein the two coils are arranged one over the other in the vertical direction of the control device, their longitudinal axes being arranged with offset at a right angle to a reference plane defined by the vertical direction and the longitudinal direction of the control device.

9. A control device for a multiway valve, comprising:
   two adjacently arranged solenoid means, to each of which a valve member to be actuated in the direction of a longitudinal axis thereof is associated, each solenoid means having a coil wherein said coils are arranged with parallel axes and with portions of their outer cylindrical surfaces facing each other;
   yoke means positioned proximate said coils and arranged for the conduction of magnetic fields generated by the coils;
   further comprising a manual operating device which possesses a first and a second manually shiftable actuating plunger associated each with one of the valve members, said actuating plungers being so arranged that longitudinal axes thereof, which coincide with the direction of shifting are extending past the longitudinal axes of the respective associated valve member with a clearance,
   a reference plane being defined extending in parallelism to the longitudinal axes of the actuating plungers and to the longitudinal axes of the valve members, wherein the valve members are arranged with an offset to each other such that their longitudinal axes are located on opposite sides of the reference plane,
   each valve member being at least partly arranged in a recess of a housing of the manual operating device, each said recess being associated with a valve seat with which the associated valve member cooperates, wherein each actuating plunger has an actuating portion located in the recess of the associated valve member for cooperation therewith upon shifting movement of the respective actuating plunger, wherein said first actuating plunger is extending past the recess associated to the actuating portion of the second actuating plunger without penetrating the recess.

10. The control device as claimed in claim 9, comprising a locking device, with which one of the actuating plungers may be selectively detachably set in the actuated position thereof.

* * * * *

UNITED STATES PATENT AND TRADEMARK OFFICE
CERTIFICATE OF CORRECTION

PATENT NO. : 5,443,093
DATED : August 22, 1995
INVENTOR(S) : Stoll, et al.

It is certified that error appears in the above-indentified patent and that said Letters Patent is hereby corrected as shown below:

Title page,
<u>In the Abstract, at line 7</u>, "yore part, which is associated with coils" should be --yoke part, which is associated with both coils--;

<u>at column 2, line 56</u>, "It comprises a valve spool" should be --It comprises a valve spool 4,--;

<u>at column 5, line 18</u>, "tile solenoid" should be --the solenoid--;

<u>at column 6, line 41</u>, "end 53" should be --end 58--;

<u>at column 6, line 42</u>, "one associated valve" should be --the associated valve--.

Signed and Sealed this

Thirtieth Day of January, 1996

BRUCE LEHMAN

Attest:

Attesting Officer

Commissioner of Patents and Trademarks